(12) United States Patent
Li et al.

(10) Patent No.: US 9,063,964 B2
(45) Date of Patent: Jun. 23, 2015

(54) DETECTING APPLICATION HARMFUL BEHAVIOR AND GRADING APPLICATION RISKS FOR MOBILE DEVICES

(71) Applicant: TrustGo Mobile, Inc., Menlo Park, CA (US)

(72) Inventors: Xuyang Li, Dublin, CA (US); Chenfu Bao, Beijing (CN); Lei Wang, Beijing (CN)

(73) Assignee: TrustGo Mobile, Inc., Menlo Park, CA (US)

( * ) Notice: Subject to any disclaimer, the term of this patent is extended or adjusted under 35 U.S.C. 154(b) by 4 days.

(21) Appl. No.: 13/734,467

(22) Filed: Jan. 4, 2013

(65) Prior Publication Data

US 2013/0212684 A1 Aug. 15, 2013

Related U.S. Application Data

(60) Provisional application No. 61/582,910, filed on Jan. 4, 2012.

(51) Int. Cl.
*G06F 21/00* (2013.01)
*G06F 17/30* (2006.01)
*G06F 21/56* (2013.01)
*G06F 21/57* (2013.01)
*G06Q 30/02* (2012.01)

(52) U.S. Cl.
CPC .... *G06F 17/30312* (2013.01); *G06F 17/30522* (2013.01); *G06F 21/562* (2013.01); *G06F 17/30867* (2013.01); *G06F 21/577* (2013.01); *G06Q 30/0282* (2013.01)

(58) Field of Classification Search
CPC .... G06F 21/562; G06F 21/563; G06F 21/577
USPC .................................. 726/22, 24, 25
See application file for complete search history.

(56) References Cited

U.S. PATENT DOCUMENTS

2012/0072991 A1* 3/2012 Belani et al. .................. 726/25
2012/0317638 A1* 12/2012 Carrara et al. ................ 726/17

* cited by examiner

*Primary Examiner* — Edward Zee
(74) *Attorney, Agent, or Firm* — Brian N. Young; Fountainhead Law Group P.C.

(57) ABSTRACT

In one embodiment, a method determines a permission list from an application and generates a set of potential behaviors. The potential behaviors are associated with actions that the application allows when executing on a mobile device where the potential behaviors are determined without execution of the application. The method then determines functional category information regarding a functional category from a set of application marketplaces that contain the application and determines application description information for the application. A required behavior list is generated including a set of required behaviors from the functional category information and the application description information. The method compares the required behaviors to the potential behaviors to determine a set of security related behaviors. The security related behaviors are behaviors found in the potential behaviors, but not in the required behaviors. A security rating is determined based on the set of security related behaviors.

20 Claims, 6 Drawing Sheets

DETECTING APPLICATION HARMFUL BEHAVIOR AND GRADING APPLICATION RISKS FOR MOBILE DEVICES

CROSS REFERENCE TO RELATED APPLICATIONS

The present disclosure claims priority to U.S. Provisional App. No. 61/582,910, entitled "Secure Application Distribution Platform", filed Jan. 4, 2012, the contents of which is incorporated herein by reference in its entirety.

The present disclosure is related to U.S. patent Application Ser. No. 13/734,550, entitled "APPLICATION RECOMMENDATION SYSYEM,", and U.S. patent application Ser. No. 13/734,453, entitled "APPLICATION CERTIFICATION AND SEARCH SYSTEM", and filed concurrently, the contents of which are incorporated herein by reference in their entirety.

BACKGROUND

As mobile electronic devices, such as smartphones, tablet computers, and smart televisions, are more commonly used, providing security on these devices becomes more important. For example, with the advent of "smart" devices, the mobile electronic devices allow users to download applications from application marketplaces. Some application marketplaces screen the applications that are offered. However, the screening process may not always perform comprehensive tests on the applications for security risks. Further, some application marketplaces are not regulated and allow any companies to place applications in the marketplace for download. This may increase the risk that some of these applications may include security risks because applications are not pre-screened.

One way a user can decide whether to download an application is to look at user reviews of the applications. However, most often, the user reviews do not mention if any of the applications include a security risk or the application may become compromised after the user reviews were submitted. Thus, after downloading the application, the application may compromise the security of the mobile electronic device and possibly the data stored by the mobile electronic device. Even worse, the applications may also compromise the security of private enterprise networks if the networks are accessed from a compromised mobile electronic device.

SUMMARY

In one embodiment, a method determines a permission list from an application and generates a set of potential behaviors from the permission list. The set of potential behaviors is associated with actions that the application allows when executing on a mobile device where the set of potential behaviors are determined without execution of the application. The method then determines functional category information regarding a functional category from a set of application marketplaces that contain the application and determines application description information for the application from the set of application marketplaces. A required behavior list is generated including a set of required behaviors from the functional category information and the application description information. The method compares the set of required behaviors to the set of potential behaviors to determine a set of security related behaviors. The security related behaviors are behaviors found in the set of potential behaviors, but not in the set of required behaviors. A security rating is determined based on the set of security related behaviors.

In one embodiment, a non-transitory computer-readable storage medium is provided containing instructions, that when executed, control a computer system to be configured for: determining a permission list from an application; generating a set of potential behaviors from the permission list, the set of potential behaviors associated with actions that the application allows when executing on a mobile device, wherein the set of potential behaviors are determined without execution of the application; determining functional category information regarding a functional category from a set of application marketplaces that contain the application; determining application description information for the application from the set of application marketplaces; generating a required behavior list including a set of required behaviors from the functional category information and the application description information; comparing the set of required behaviors to the set of potential behaviors to determine a set of security related behaviors, wherein security related behaviors are behaviors found in the set of potential behaviors, but not in the set of required behaviors; and determining a security rating based on the set of security related behaviors.

In one embodiment, an apparatus is provided comprising: one or more computer processors; and a non-transitory computer-readable storage medium comprising instructions, that when executed, control the one or more computer processors to be configured for: determining a permission list from an application; generating a set of potential behaviors from the permission list, the set of potential behaviors associated with actions that the application allows when executing on a mobile device, wherein the set of potential behaviors are determined without execution of the application; determining functional category information regarding a functional category from a set of application marketplaces that contain the application; determining application description information for the application from the set of application marketplaces; generating a required behavior list including a set of required behaviors from the functional category information and the application description information; comparing the set of required behaviors to the set of potential behaviors to determine a set of security related behaviors, wherein security related behaviors are behaviors found in the set of potential behaviors, but not in the set of required behaviors; and determining a security rating based on the set of security related behaviors.

The following detailed description and accompanying drawings provide a better understanding of the nature and advantages of particular embodiments.

DETAILED DESCRIPTION

Described herein are techniques for a security ratings system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a security ratings system for applications offered by application marketplaces. The security ratings may be tailored to how the applications operate and are used on mobile devices. A user may then review the security ratings and decide whether to download an application. Further, the security ratings may be sent to a user to warn the user of a possible security threat for an application currently residing on the user's mobile device.

System Overview

Figure 1:
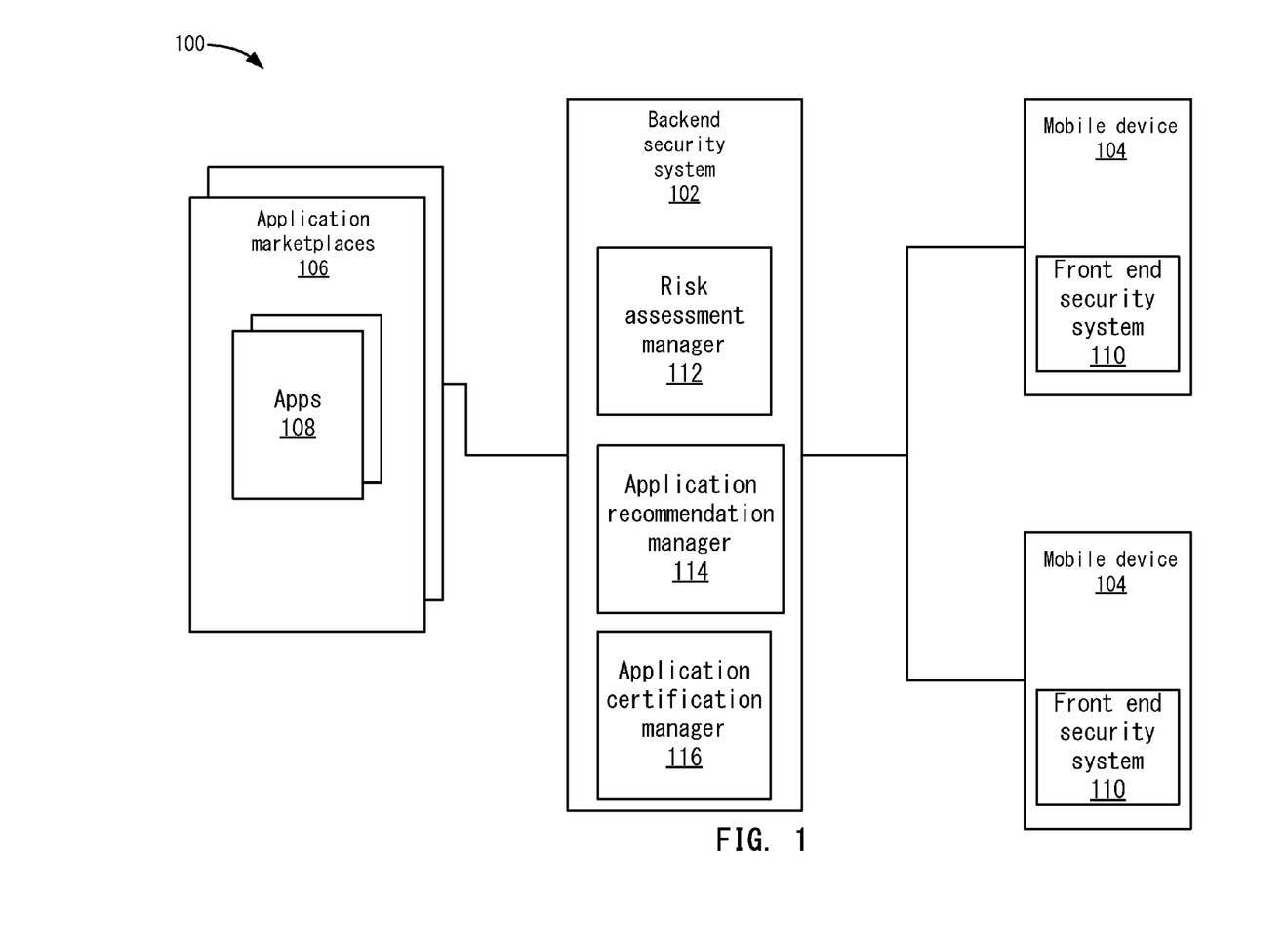
FIG. 1 depicts a simplified system for providing security according to one embodiment.

FIG. 1 depicts a simplified system 100 for providing security according to one embodiment. System 100 includes a back-end security system 102 that may interact with mobile devices 104. In one embodiment, back-end security system 102 provides security services to mobile devices 104, which download applications (apps) 108 from application marketplaces 106.

Mobile devices 104 may be computing devices that can download applications 108, such as smartphones, tablet computers, smart televisions, laptop computers, and personal computers. Mobile devices 104 include a front-end security system 110 that may analyze applications 108 for security risks on mobile device 104. Front-end security system 110 evaluates applications 108 on mobile device 104 according to multiple independent aspects of security. In some examples, front-end security system 110 may interact with back-end security system 102 to send results of analysis of applications 108 on mobile device 104. For example, front-end security system 110 may analyze the use of applications 108, scan mobile device 104 for security risks, and then send information related to the analysis to back-end security system 102.

In one embodiment, back-end security system 102 includes a risk assessment manager 112, an application recommendation manager 114, and an application certification manager 116. Risk assessment manager 112 may assess the risk of applications 108 and provide a security rating based on the assessment. In one embodiment, the security rating may be tailored to how applications 108 are used on mobile devices 104. For example, the security ratings may include certified, malicious, high-risk, and low-risk/noisy ratings. These security ratings will be described in more detail below.

Application recommendation manager 114 may recommend new applications to users. In one embodiment, application recommendation manager 114 may communicate with front-end security system 110 to determine the new application recommendations. For example, application recommendation manager 114 may use user preferences and user behaviors that are determined based on actions performed on mobile device 104 in addition to information from similar users, such as a user's friends in a social network, to determine the application recommendations. In one embodiment, application recommendation manager 114 may provide the application recommendations based on communication with front-end security system 110. In other embodiments, front-end security system 110 may determine the application recommendations without communication with back-end security system 102.

Application certification manager 116 provides certification that an instance of an application 108 in a marketplace 106 is an authentic copy. For example, an instance of an application 108 may be found in multiple application marketplaces 106. However, specific instances of the application may not be certified copies. That is, other companies may copy an application 108 and/or modify an application 108. Application certification manager 116 scans applications 108 in application marketplaces 106, and can determine whether applications 108 are a certified copy. Thus, when a user wants to download an application 108 from a specific application marketplace 106, the user can review the application certification to determine whether to download the application. Additionally, the application certification may indicate to users, organizations, enterprises, application stores, device providers, networks, and/or any other interested party, that the application has adequate security. The security certification may be unique to each certified application so that users can validate its authenticity.

Security Ratings

Figure 2:
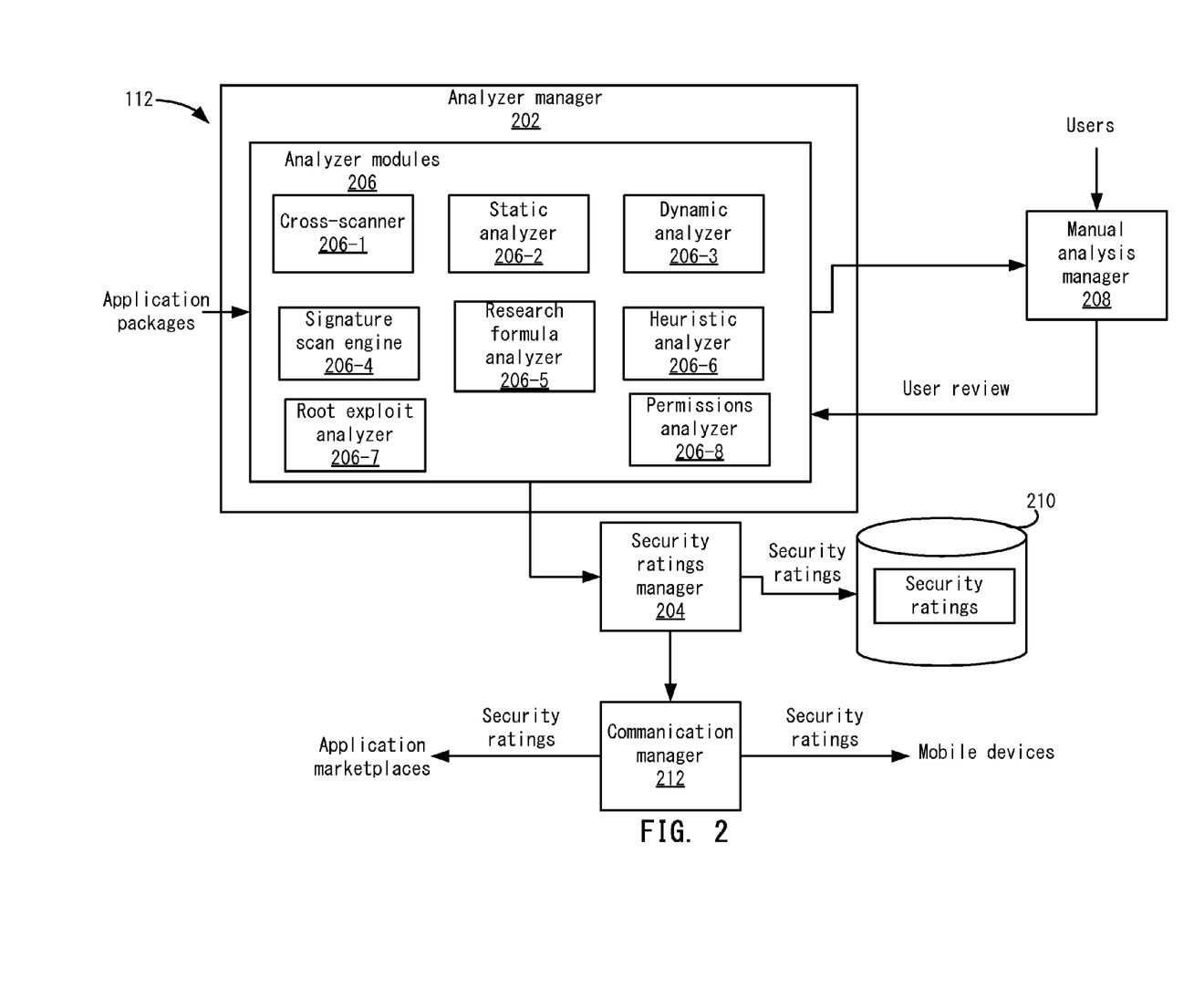
FIG. 2 depicts a more detailed example of risk assessment manager according to one embodiment.

FIG. 2 depicts a more detailed example of risk assessment manager 112 according to one embodiment. An analyzer manager 202 may analyze applications 108 to provide information to a security ratings manager 204, which uses the information to determine security ratings for applications 108. In one embodiment, the security rating is determined without analyzing information from mobile devices 104. That is, how the application operates on mobile devices 104 is not analyzed to provide the security rating. This has a benefit in that malicious software may be determined before being downloaded onto mobile devices 104 where the applications could be harmful.

Analyzer manager 202 may receive application packages, which may include application executable program files and associated data resources, and application metadata, such as an application name, a description, an author, a price, a download count, a review score, reviews by users, comments, a category of the application, version, an operating system (OS), icons, thumbnails, a release date, and update dates. Analyzer manager 202 may then analyze the application package and provide information regarding the application to security ratings manager 204. The analysis that is performed is described in more detail below.

In one embodiment, analyzer manager 202 includes different automatic analyzer modules 206, such as a cross-scanner 206-1, a static analyzer 206-2, a dynamic analyzer 206-3, a signature scan engine 206-4, a research formula analyzer 206-5, a heuristic analyzer 206-6, a root exploit analyzer 206-7, and a permission analyzer 206-8. In some cases, information from all of these analyzers is used, but only a portion of the analyzers may be used in other cases to determine security ratings.

Analyzer modules 206, such as a research formula analyzer 206-5 and heuristic analyzer 206-6, access the application package and application metadata from the application database. Research formula analyzer 206-5 analyzes the application package and metadata using one or more rules. Rules may be specified by administrative users using conditional logic, such as a "if this then that" format via an interface, such as a web interface. Analyzer modules 206 receive samples of known malicious applications to identify patterns that are unique to these types of applications. Heuristic analyzer 206-6 then compares incoming applications with these patterns to identify any meaningful similarities that would identify an incoming application that is suspicious. A signature analyzer compares signatures of incoming applications with these patterns to identify any meaningful similarities.

Particular embodiments may include other types of analyzer modules 206 for analyzing different security aspects of the applications. In an embodiment, the set of analyzer modules 206 is managed by an analyzer framework. A profiler gets information from application package file. A cross scan analyzer 206-1 scans applications by other vendors to get reference. A malware variant scanner (not shown) detects variants of malware. A certificate analyzer (not shown) analyzes cryptographic certificates associated with the application and may include a blacklist and a whitelist for certificates. A root exploit analyzer 206-7 determines if an application performs any actions to circumvent operating system privileges, such as gaining root privilege. A permission analyzer 206-8 is used to analyze the operating system permissions given to the application. A dynamic analyzer 206-3 analyzes the dynamic resource use of the application, such as processor, memory, battery, data storage, network traffic, and other system resource usage of an application. Dynamic analyzer 206-3 also analyzes communication of any private information to a $3^{rd}$ party server or if the application performs any malicious actions at runtime. In an embodiment, dynamic analyzer 206-3 simulates real usage of the application. Static analyzer 206-2 is used to analyze the actions that the application attempts to perform.

In addition to automatic analysis, a manual analysis manager 208 may be used. For example, based on the automatic analysis, analyzer manager 202 may send certain applications 108 to manual analysis manager 208. A security analyst may then manually analyze applications 108. For example, the manual analysis may rate the security risk of application 108 or may confirm or deny the automatic security risk information determined by analyzer manager 202. Once the security analyst review is performed, manual analysis manager 208 may send the security analyst review back to analyzer manager 202, which can take into account the security analyst review in its automatic analysis.

If the suspicious application is determined to compromise one or more aspects of security, a digital signature or hash of the application is created to identify other instances of that application. This digital signature is provided to the signature based signature scan engine 206-4 for use in scanning for applications with the same signature.

Depending on the analysis, security ratings manager 204 assigns a security rating to each application 108 and may store the security rating in an application database 210. The various security ratings include certified, malicious, high-risk, faked/cloned, and low-risk/noisy ratings and how mobile devices 104 uniquely use applications 108 in a mobile environment.

In one embodiment, the certified security rating is for secured and approved applications 108 from trusted providers that are determined to pose no threat to mobile devices 104. The malicious security rating is for applications 108 that may intentionally harm mobile device 104 or any computing device coupled to mobile device 104. This may include Trojan horses, viruses, and spyware. Further, certain behaviors that are unique to mobile devices 104 may be exhibited by malicious applications, such as sending short message service (SMS) messages without user's consent and in some cases sending premium-rate SMS messages; downloading and installing other applications without a user's consent; and compromising a user's privacy information, such as a user's contacts, global positioning satellite (GPS) location, call histories, SMS messages, and other personal information for the user.

A high-risk security rating means that applications 108 may be potentially dangerous. For example, these applications 108 may perform certain mobile device behaviors that include leaking personal identifiable information, such as a phone number, in plain text; performing actions that lead to unexpected charges on a user's telephone bill; modifying the operating system of mobile device 104; monitoring mobile device 104 or tracking the position of mobile device 104; or downloading other applications without confirmation. These applications 108 may also contain possible security vulnerabilities, such as hacking tools.

The faked/cloned security rating is for applications that have been copied from certified applications. For example, a company may copy a certified application and try to pass it off as the certified copy. However, the cloned copy may not function in the same way as the certified copy or may include malicious software.

The low-risk/noisy security rating includes applications that perform behaviors related to use of mobile devices 104. The behaviors include frequently pushing advertisements to a user, such as to a notification bar or through pop-up windows, aggressively displaying advertisements on a home screen even if the application is running in the background or closed; aggressively promoting other applications by prompting a user to download the applications; leaking a device identifier, such as an IMEI or IMSI, in plain text. It should be noted that these behaviors may not be a security risk as in these behaviors do not perform malicious actions to mobile device 104. However, these actions may create noise to a user, such as distracting them with advertisements.

Once the security ratings are stored in storage 210, a communication manager 212 may communicate the security rating to mobile devices 104 that include applications 108 that have been rated. Additionally, communication manager 212 may communicate the security rating to application marketplaces 106. The marketplaces may display the security rating in the marketplace to allow users to determine whether they want to download applications 108.

Figure 3:
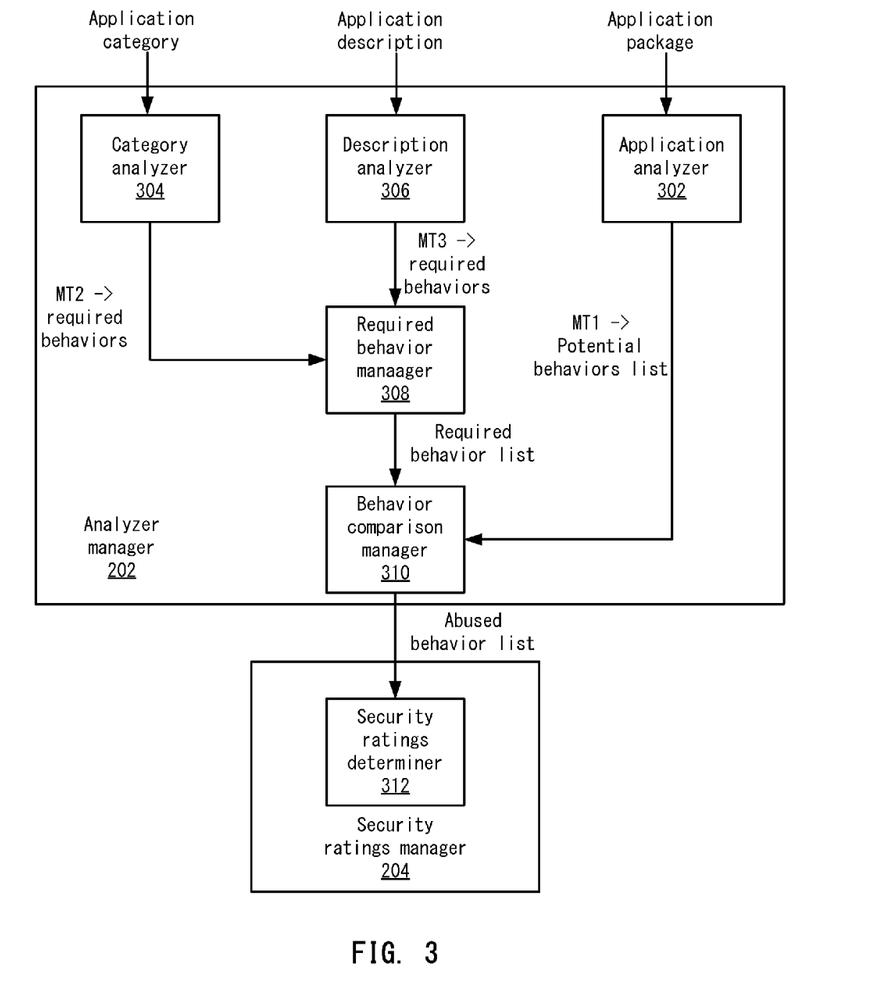
FIG. 3 depicts a more detailed example of an analyzer manager and a security ratings manager according to one embodiment.

FIG. 3 depicts a more detailed example of analyzer manager 202 and security ratings manager 204 according to one embodiment. In one embodiment, the potential harmful behavior of applications 108 and grading of the security risks are determined without actually executing applications 108 on mobile devices 104. Particular embodiments define a set of behaviors that will affect the security of mobile device 104. For example, these behaviors may include behaviors that are associated with operating a mobile device, such as initiating a phone call, sending an SMS message, tracking the location of mobile device 104, accessing the contacts and sending contact information, accessing mobile device information, accessing the camera/video and initiating the camera or video recorder, accessing SMS content, and accessing a call log. Based on which behaviors are determined that an application 108 can perform, a different security rating may be applied to each behavior and/or application 108.

An application analyzer 302 receives an application package. As discussed above, the application package may include an application executable and/or application metadata. Application analyzer 302 analyzes the application package to determine a permission list, which may be a set of permissions that are set in application 108 to allow certain behaviors to be performed. The operating system defines or provides a list of APIs that applications can use to trigger certain actions or access certain data. Each permission is associated to a set of APIs. To access the APIs, an application needs to claim proper permissions that are associated to the APIs the application wants to invoke. However, the combination of same set of APIs can generate various kinds of behaviors and thus consequences from the behaviors on the mobile device, which can be secure to the user as well as harmful to the user. Static analyzer 206-2 extracts all the permissions from an application that the application claims to use and check that the application has claimed more permissions than it needs for normal or secure behavior. Dynamic analyzer 206-3 goes one step further by analyzing how the APIs associated with the permissions that an application has declared to use are used inside the code of the application and thus determines the kind of runtime behaviors that are triggered to determine whether any of runtime behaviors are harmful to the mobile device and/or users. Application analyzer 302 may determine the permission list from the application's executable file or application metadata.

Application analyzer 302 uses the permission list to generate a set of potential behaviors for application 108. In one embodiment, a first mapping table (MT1) is used to determine the potential behaviors. For example, mapping table #1 may map different permissions to different potential behaviors. For each permission in the permission list, a list of potential behaviors is determined. The following may be used to determine the set of potential behaviors:

```
For each permission combination PC in MT1:
    if PC in CPL
        BL = MT1(PC);
        Add BL into PBL,
``` where PC is a permission and CPL is a permission list, BL is the set of possible behaviors, and PBL is a potential behavior list. The above determines the list of behaviors by applying the permissions to mapping table #1 and then adds the behaviors determined as potential behaviors in the PBL. An example of mapping table #1 may be:

| Permission | Behavior |
|---|---|
| READ_CONTACT | Get contact list |
|  | Get call history |

In the above, if the permission of "READ_CONTACT" is determined, then the behaviors of accessing the contact list and accessing the call history are added. The potential behaviors in the PBL for all permissions will be used later in the process described below.

A category analyzer 304 collects category information for an application 108 from various application marketplaces 106. For example, different marketplaces 106 may be offering an instance of application 108. However, different marketplaces 106 may categorize the same application 108 in different categories. For example, one application marketplace 106 may categorize application 108 in a general "games" category and another application marketplace 106 may categorize application 108 in a "race car game" category. Category analyzer 304 may receive the categories that application marketplaces 106 have used based on a crawling of application marketplaces 106 for category information. For example, once an application 108 is found, the crawler captures how the marketplace categorizes the application.

In one embodiment, category analyzer 304 may select a default category (DC) based on the category information received from all application marketplaces 106. The default category may be selected by selecting one application marketplace that is well-known or trusted and using the category of that application marketplace.

Category analyzer 304 then uses a second mapping table #2 (MT2) that maps categories to required behaviors. For example, mapping table #2 may include all possible default categories and the required behaviors that are to be performed for any application that is categorized in that category. An example of mapping table #2 may be:

| Category | Behavior |
|---|---|
| Social Network | Get contact list |
|  | Access Internet |

In the above, if the category of "Social Network" is determined, then the behavior of accessing the contact list and the Internet is determined.

An application description analyzer 306 receives an application description, which may include an application name and synopsis of the application functionality. In one example, a crawler may crawl through various application marketplaces 106 to determine the application name and description from each application marketplace 106. For example, different marketplaces may have a different description of an instance of application 108. Further, different applications may have different names in different marketplaces, but may be the same application.

Application description analyzer 306 includes a third mapping table #3 (MT3) that maps keywords to required behaviors. An example of mapping table #3 may be:

| Keyword | Behavior |
|---|---|
| phone call | Call phone |
| video call | Call phone dialer/Call phone |

In the above, various keywords are mapped to behaviors, such as a keyword of phone call is mapped to a behavior of making a phone call. For example, application description analyzer 306 may extract keywords from the functional description and/or application name. The keywords may be information that describes application 108, such as an e-mail messaging application, a game, etc. Application description analyzer 306 outputs required behaviors based on inputting the keywords into mapping table #3.

A required behavior manager 308 receives required behaviors from category analyzer 304 and application description analyzer 306. Required behavior manager 308 may then output a set of required behaviors. Required behavior manager 308 may use the following algorithm to determine the set of required behaviors:

```
BL1 = MT2(DC);
Add BL1 into RBL;
For each keywords K in TF
    BL2 = MT3(DC, K);
    Add BL2 into RBL,
``` where BL1 is a first set of required behaviors from category analyzer 304, DC is a default category, RBL is a required behavior list, BL2 is a second list of required behaviors from description analyzer 306, and K is a constant. The above algorithm determines a first behavior list (RBL) based on the output of mapping table #2 and adds the behaviors into a required behavior list (RBL). For each of the keywords determined from the application description, a behavior list BL2 is determined by applying the keywords to a mapping table #3. The second required behavior list BL2 is then added into the required behavior list RBL.

A behavior comparison manager 310 receives the required behavior list in addition to the potential behavior list. Behavior comparison manager 310 then compares the required behaviors to potential behaviors and generates an abused behavior list (ABL). The following algorithm may be used:

```
For each behavior B in PBL
    if it not in RBL
        Add B into ABL;
```

If the abused behavior list is an empty set, i.e., no behaviors were added into the abused behavior list, security ratings determiner 312 in security ratings manager 204 may consider application 108 to be certified. Otherwise, security ratings determiner 312 may base the security rating on each behavior on the abused behavior list. For example, security ratings determiner 312 may review each behavior and assign a security rating. That is, each behavior may be given one of the security ratings.

Once each behavior has been rated, then security ratings determiner 312 determines an overall security rating. For example, if application 108 includes a high percentage of behaviors that are in the low-risk/noisy security rating, security rating determiner 312 assigns a low-risk/noisy security rating to application 108. Also, the number of behaviors may be applied to a threshold for each security rating to determine whether that security rating should be assigned to application 108. In other cases, if one behavior is included in a certain security rating, such as malicious, then that security rating is assigned to application 108. For example, if an application exhibits just one malicious behavior, then it is desirable to assign this application as being malicious because it may not be desirable to have an application perform any malicious behavior.

Particular embodiments may also be used for an Android™ application. In this case, a list of Android permissions may be mapped into a security rating.

Figure 4:
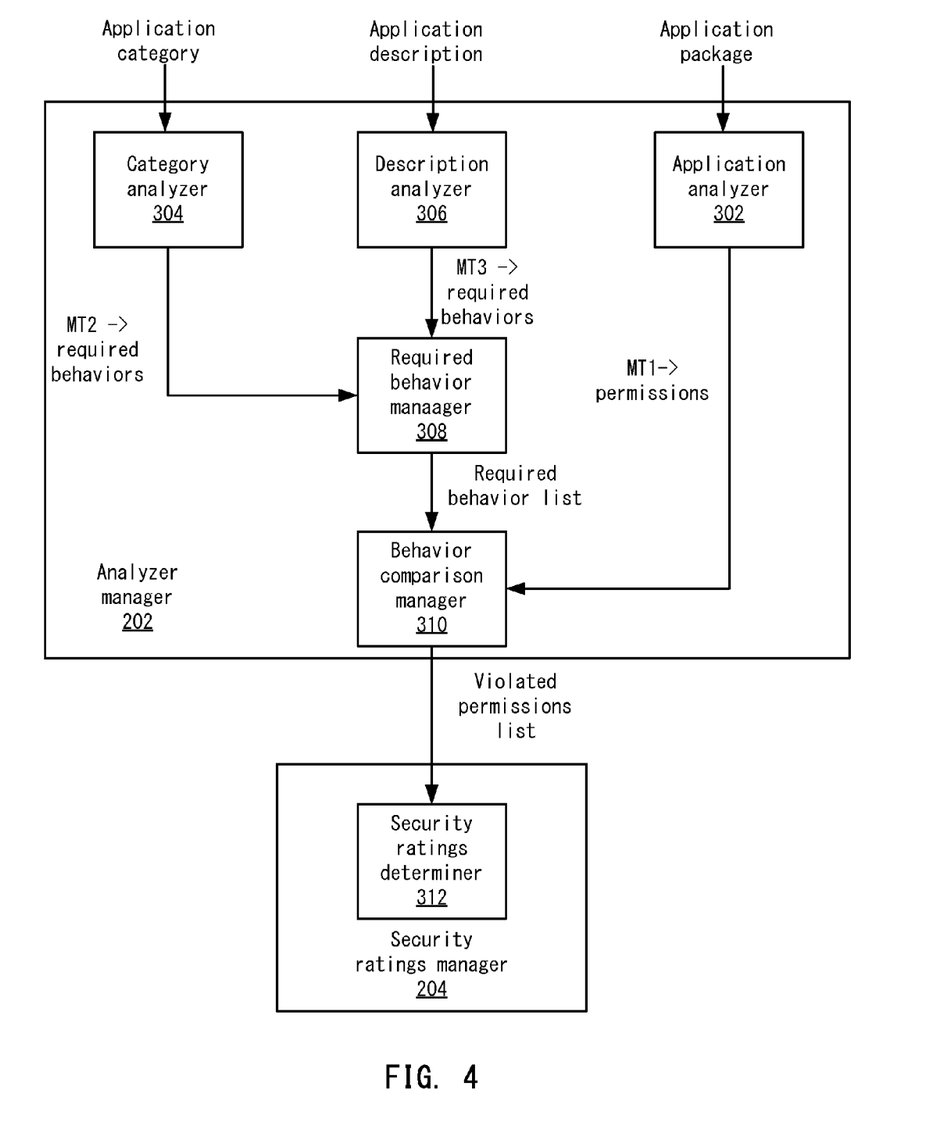
FIG. 4 depicts a more detailed example of the analyzer manager and the security ratings manager for a list of Android permissions according to one embodiment.

FIG. 4 depicts a more detailed example of analyzer manager 202 and security ratings manager 204 for a list of Android permissions according to one embodiment. An application analyzer 302 receives an application package. As discussed above, the application package may include an application executable and/or application metadata. Application analyzer 302 analyzes the application package to determine an Android permission list, which may be a set of permissions that are set in application 108 to allow certain behaviors to be performed in Android. Application analyzer 302 may determine the permission list from the application's executable file or application metadata.

Application analyzer 302 maps each permission to a security rating (SR(P)) using a first mapping table #1 (MT1).

A category analyzer 304 collects category information for an application 108 from various application marketplaces 106. For example, different marketplaces 106 may be offering an instance of application 108. However, different marketplaces 106 may categorize the same application 108 in different categories. For example, one application marketplace 106 may categorize application 108 in a general games category and another application marketplace 106 may categorize application 108 in a race car game category. Category analyzer 304 may receive the categories that application marketplaces 106 have used based on a crawling of application marketplaces 106 for category information. For example, once an application 108 is found, the crawler captures how the marketplace categorizes the application.

In one embodiment, category analyzer 304 may select a default category (DC) based on the category information received from all application marketplaces 106. The default category may be selected by selecting one application marketplace that is well-known or trusted and using the category of that application marketplace.

Category analyzer 304 then uses a second mapping table #2 (MT2) that maps categories to required behaviors. For example, mapping table #2 may include all possible default categories and the required behaviors that are to be performed for any application that is categorized in that category An application description analyzer 306 receives an application description, which may include an application name and synopsis of the application functionality. In one example, a crawler may crawl through various application marketplaces 106 to determine the application name and description from each application marketplace 106. For example, different marketplaces may have a different description of an instance of application 108. Further, different applications may have different names in different marketplaces, but may be the same application.

Application description analyzer 306 includes a third mapping table #3 (MT3) that maps keywords to required behaviors. For example, application description analyzer 306 may extract keywords from the functional description and/or application name. The keywords may be information that describes application 108, such as an e-mail messaging application, a game, etc. Application description analyzer 306 outputs required behaviors based on inputting the keywords into mapping table #3.

A required behavior manager 308 receives required behaviors from category analyzer 304 and application description analyzer 306. Required behavior manager 308 may then output a set of required behaviors. Required behavior manager 308 may use the following algorithm to determine the set of required behaviors:

```
BL1 = MT2(DC);
Add BL1 into RBL;
For each keywords K in TF
    BL2 = MT3(DC, K);
    Add BL2 into RBL,
``` where BL1 is a first set of required behaviors from category analyzer 304, DC is a default category, RBL is a required behavior list, BL2 is a second list of required behaviors from description analyzer 306, and K is a constant. The above algorithm determines a first behavior list (RBL) based on the output of mapping table #2 and adds the behaviors into a required behavior list (RBL). For each of the keywords determined from the application description, a behavior list BL2 is determined by applying the keywords to a mapping table #3. The second required behavior list BL2 is then added into the required behavior list RBL.

A behavior comparison manager 310 receives the required behavior list in addition to the potential behavior lists. Behavior comparison manager 310 then compares the required behaviors to potential behaviors and generates a violated permission list (VPL). The following algorithm may be used:

```
For each behavior B in PBL
    if it not in RBL
        Add B into VPL;
```

If the violated permission list is an empty set, i.e., no permissions were added into the violated permission list, security ratings determiner 312 in security ratings manager 204 may consider application 108 to be certified. Otherwise, security ratings determiner 312 may base the security rating on each behavior on the violated permission list. For example, security ratings determiner 312 may review each permission and assign a security rating. For example, each permission may be given one of the security ratings.

Once each permission has been rated, then security ratings determiner 312 determines an overall security rating. For example, if application 108 includes a high percentage of permissions that are in the low-risk/noisy security rating, security rating determiner 312 assigns a low-risk/noisy security rating to application 108. Also, the number of permissions may be applied to a threshold for each security rating to determine whether that security rating should be assigned to application 108. In other cases, if one permission is included in a certain security rating, such as malicious, then that security rating is assigned to application 108. For example, if an application exhibits just one malicious permission, then it is desirable to assign this application as being malicious because it may not be desirable to have an application perform any malicious permission.

Figure 5:
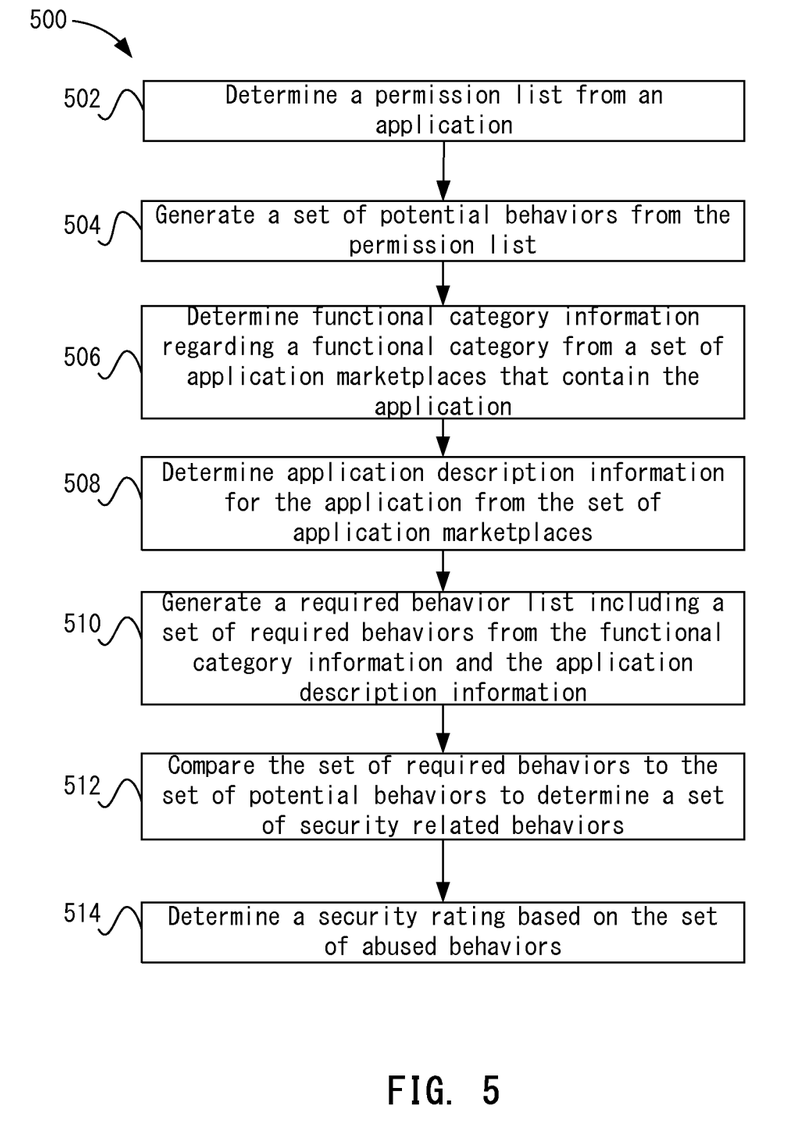
FIG. 5 depicts a simplified flowchart of a method for determining security ratings according to one embodiment.

FIG. 5 depicts a simplified flowchart 500 of a method for determining security ratings according to one embodiment. At 502, risk assessment manager 112 determines a permission list from an application 108. The permission list may be determined from an application package.

At 504, risk assessment manager 112 generates a set of potential behaviors from the permission list. The set of potential behaviors are associated with actions that the application allows when executing on a mobile device. In one embodiment, risk assessment manager 112 determines the set of potential behaviors without execution of the application.

At 506, risk assessment manager 112 determines functional category information regarding a functional category from a set of application marketplaces 106 that contain the application. The functional category information may be different for different marketplaces 106 and a default category may be determined.

At 508, risk assessment manager 112 determines application description information for the application from the set of application marketplaces. The application description information may be keywords from a synopsis of the application.

At 510, risk assessment manager 112 generates a required behavior list including a set of required behaviors from the functional category information and the application description information. Risk assessment manager 112 may use mapping tables to generate the required behavior list.

At 512, risk assessment manager 112 compares the set of required behaviors to the set of potential behaviors to determine a set of security related behaviors. The security related behaviors may be abused behaviors or abused permissions as described above. In one embodiment, the security related behaviors are behaviors found in the set of potential behaviors, but not in the set of required behaviors. At 514, risk assessment manager 112 determines a security rating based on the set of abused behaviors.

Figure 6:
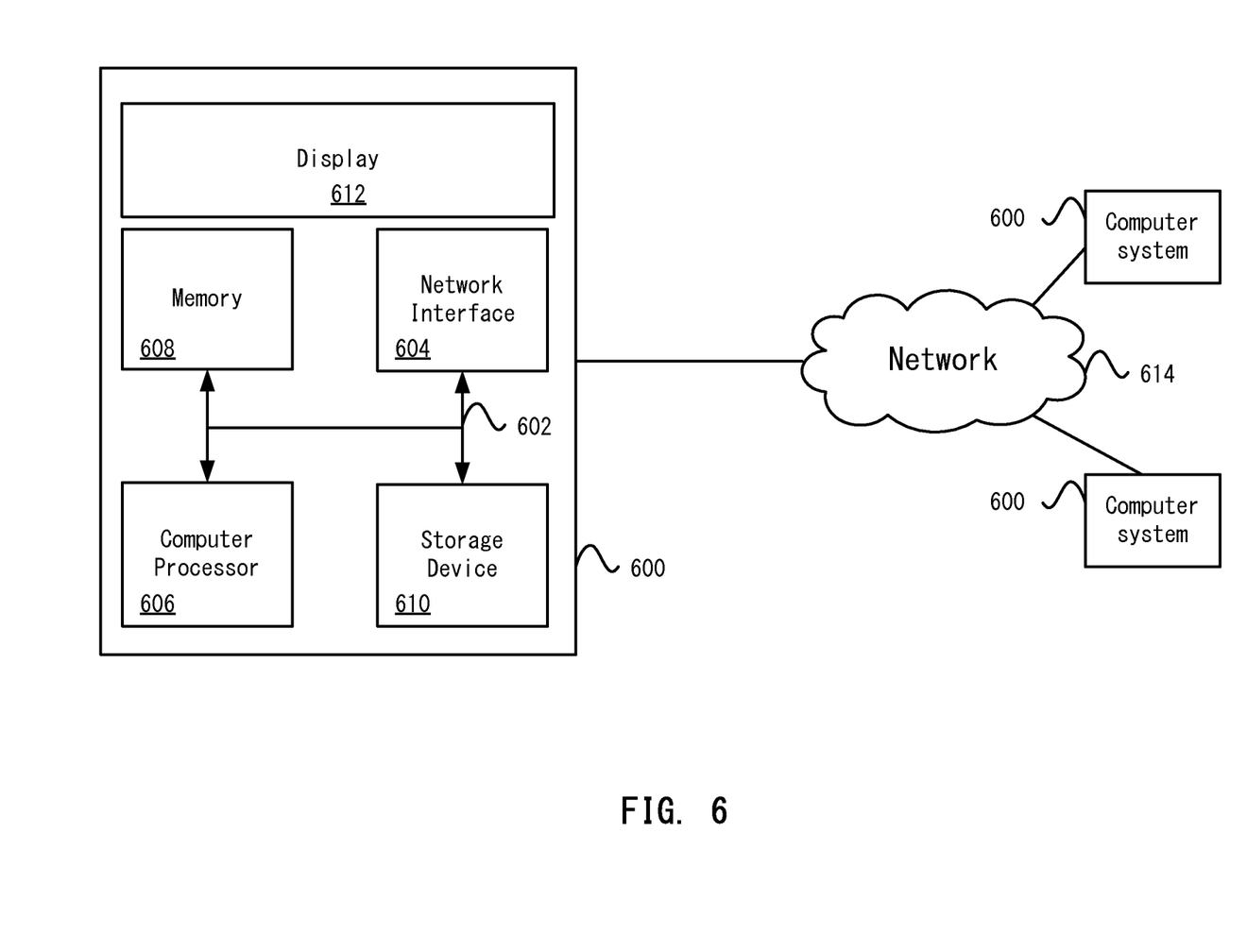
FIG. 6 illustrates an example of a special purpose computer system configured with a security ratings system according to one embodiment.

FIG. 6 illustrates an example of a special purpose computer system 600 configured with a security ratings system according to one embodiment. Computer system 600 includes a bus 602, network interface 604, a computer processor 606, a memory 608, a storage device 610, and a display 612.

Bus 602 may be a communication mechanism for communicating information. Computer processor 604 may execute computer programs stored in memory 608 or storage device 608. Any suitable programming language can be used to implement the routines of particular embodiments including C, C++, Java, assembly language, etc. Different programming techniques can be employed such as procedural or object oriented. The routines can execute on a single computer system 600 or multiple computer systems 600. Further, multiple processors 606 may be used.

Memory 608 may store instructions, such as source code or binary code, for performing the techniques described above. Memory 608 may also be used for storing variables or other intermediate information during execution of instructions to be executed by processor 606. Examples of memory 608 include random access memory (RAM), read only memory (ROM), or both.

Storage device 610 may also store instructions, such as source code or binary code, for performing the techniques described above. Storage device 610 may additionally store data used and manipulated by computer processor 606. For example, storage device 610 may be a database that is accessed by computer system 600. Other examples of storage device 610 include random access memory (RAM), read only memory (ROM), a hard drive, a magnetic disk, an optical disk, a CD-ROM, a DVD, a flash memory, a USB memory card, or any other medium from which a computer can read.

Memory 608 or storage device 610 may be an example of a non-transitory computer-readable storage medium for use by or in connection with computer system 600. The computer-readable storage medium contains instructions for controlling a computer system to be operable to perform functions described by particular embodiments. The instructions, when executed by one or more computer processors, may be operable to perform that which is described in particular embodiments.

Computer system 600 includes a display 612 for displaying information to a computer user. Display 612 may display a user interface used by a user to interact with computer system 600.

Computer system 600 also includes a network interface 604 to provide data communication connection over a network, such as a local area network (LAN) or wide area network (WAN). Wireless networks may also be used. In any such implementation, network interface 604 sends and receives electrical, electromagnetic, or optical signals that carry digital data streams representing various types of information.

Computer system 600 can send and receive information through network interface 604 across a network 614, which may be an Intranet or the Internet. Computer system 600 may interact with other computer systems 600 through network 614. In some examples, client-server communications occur through network 614. Also, implementations of particular embodiments may be distributed across computer systems 600 through network 614.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   determining, by a computing system, a permission list from an application;
   generating, by the computing system, a set of potential behaviors from the permission list, the set of potential behaviors associated with actions that the application allows when executing on a mobile device, wherein the set of potential behaviors are determined without execution of the application;
   retrieving, by the computing system, a plurality of functional categories that a plurality of application marketplaces which contain the application categorize the application;
   retrieving, by the computing system, a plurality of application descriptions for the application from the plurality of application marketplaces;
   using, by the computing system, the plurality of functional categories and the plurality of application descriptions to generate a required behavior list including a set of required behaviors;
   comparing, by the computing system, the set of required behaviors to the set of potential behaviors to determine a set of security related behaviors, wherein security related behaviors are behaviors found in the set of potential behaviors, but not in the set of required behaviors; and
   determining, by the computing system, a security rating based on the set of security related behaviors for the application in the plurality of application marketplaces.

2. The method of claim 1, wherein determining the permission list comprises:
   reading an executable file for the application or application metadata for the application to determine the set of potential behaviors; and
   generating the set of potential behaviors based on a mapping table that maps permissions determined from the executable file or the application metadata to potential behaviors.

3. The method of claim 1, wherein using the plurality of functional categories and the plurality of application descriptions to generate the required behavior list comprises generating a first set of required behaviors based on a mapping table that maps the plurality of functional categories to required behaviors.

4. The method of claim 3, wherein using the plurality of functional categories and the plurality of application descriptions to generate the required behavior list comprises generating a second set of required behaviors based on a mapping table that maps the plurality of application descriptions to required behaviors.

5. The method of claim 1, wherein retrieving the plurality of application descriptions comprises determining a set of keywords that describe the application based on the plurality of application descriptions.

6. The method of claim 5, wherein using the plurality of functional categories and the plurality of application descriptions to generate the required behavior list comprises inputting the set of keywords into a mapping table to map the keywords to required behaviors in the set of required behaviors.

7. The method of claim 1, wherein the security rating is selected from certified, malicious, high risk, low/noisy ratings.

8. The method of claim 1, wherein the security rating is determined without executing the application on a computing device or information from executing the application on the computing device.

9. The method of claim 1, further comprising sending the security rating to a mobile device or an application marketplace.

10. The method of claim 1, wherein determining the security rating comprises:
    determining a security rating for each security related behavior; and
    determining the security rating for the application based on the security rating for each security related behavior.

11. The method of claim 10, further comprising comparing the security rating for each security related behavior to a set of thresholds to select one of the security ratings for a portion of the security related behaviors.

12. A method comprising:
    determining, by a computing system, a permission list from an application;
    generating, by the computing system, a set of potential behaviors from the permission list, the set of potential behaviors associated with actions that the application allows when executing on a mobile device, wherein the set of potential behaviors are determined without execution of the application;
    retrieving by the computing system, functional category information regarding a functional category that a set of application marketplaces which contain the application categorize the application;
    retrieving, by the computing system, application description information for the application from a description of the application in the set of application marketplaces;
    generating, by the computing system, a required behavior list including a set of required behaviors from the functional category information and the application description information;
    comparing, by the computing system, the set of required behaviors to the set of potential behaviors to determine a set of security related behaviors, wherein security related behaviors are behaviors found in the set of potential behaviors, but not in the set of required behaviors; and
    determining, by the computing system, a security rating based on the set of security related behaviors,
    wherein retrieving the functional category information comprises:
    determining a set of functional categories from the set of application marketplaces, wherein at least two marketplaces categorize the application in a different functional category;
    determining a category definition for at least one of the functional categories in at least one of the application marketplaces; and
    selecting a default functional category based on the category definition, wherein the default functional category is used to determine the set of required behaviors.

13. The method of claim 12, wherein generating the required behavior list comprises inputting the default category into a mapping table to map the default category to set of required behaviors.

14. A non-transitory computer-readable storage medium containing instructions, that when executed, control a computer system to be configured for:
- determining a permission list from an application;
- generating a set of potential behaviors from the permission list, the set of potential behaviors associated with actions that the application allows when executing on a mobile device, wherein the set of potential behaviors are determined without execution of the application;
- retrieving a plurality of functional categories that a plurality of application marketplaces which contain the application categorize the application;
- retrieving a plurality of application descriptions for the application from the plurality of application marketplaces;
- using the plurality of functional categories and the plurality of application descriptions to generate a required behavior list including a set of required behaviors;
- comparing the set of required behaviors to the set of potential behaviors to determine a set of security related behaviors, wherein security related behaviors are behaviors found in the set of potential behaviors, but not in the set of required behaviors; and
- determining a security rating based on the set of security related behaviors for the application in the plurality of application marketplaces.

15. The non-transitory computer-readable storage medium of claim 14, wherein determining the permission list comprises:
- reading an executable file for the application or application metadata for the application to determine the set of potential behaviors; and
- generating the set of potential behaviors based on a mapping table that maps permissions determined from the executable file or the application metadata to potential behaviors.

16. The non-transitory computer-readable storage medium of claim 14, wherein using the plurality of functional categories and the plurality of application descriptions to generate the required behavior list comprises generating a first set of required behaviors based on a mapping table that maps the plurality of functional categories to required behaviors.

17. The non-transitory computer-readable storage medium of claim 14, wherein retrieving the plurality of application descriptions comprises determining a set of keywords that describe the application based on the plurality of application descriptions.

18. The non-transitory computer-readable storage medium of claim 14, wherein the security rating is selected from certified, malicious, high risk, low/noisy ratings.

19. A non-transitory computer-readable storage medium containing instructions, that when executed, control a computer system to be configured for:
- determining a permission list from an application;
- generating a set of potential behaviors from the permission list, the set of potential behaviors associated with actions that the application allows when executing on a mobile device, wherein the set of potential behaviors are determined without execution of the application;
- retrieving functional category information regarding a functional category that a set of application marketplaces which contain the application categorize the application;
- retrieving application description information for the application from a description of the application in the set of application marketplaces;
- generating a required behavior list including a set of required behaviors from the functional category information and the application description information;
- comparing the set of required behaviors to the set of potential behaviors to determine a set of security related behaviors, wherein security related behaviors are behaviors found in the set of potential behaviors, but not in the set of required behaviors; and
- determining a security rating based on the set of security related behaviors, wherein retrieving the functional category information comprises:
- determining a set of functional categories from the set of application marketplaces, wherein at least two marketplaces categorize the application in a different functional category;
- determining a category definition for at least one of the functional categories in at least one of the application marketplaces; and
- selecting a default functional category based on the category definition, wherein the default functional category is used to determine the set of required behaviors.

20. An apparatus comprising:
one or more computer processors; and
a non-transitory computer-readable storage medium comprising instructions, that when executed, control the one or more computer processors to be configured for:
- determining a permission list from an application;
- generating a set of potential behaviors from the permission list, the set of potential behaviors associated with actions that the application allows when executing on a mobile device, wherein the set of potential behaviors are determined without execution of the application;
- retrieving a plurality of functional categories that a plurality of application marketplaces which contain the application categorize the application;
- retrieving a plurality of application descriptions for the application from the plurality of application marketplaces;
- using the plurality of functional categories and the plurality of application descriptions to generate a required behavior list including a set of required behaviors;
- comparing the set of required behaviors to the set of potential behaviors to determine a set of security related behaviors, wherein security related behaviors are behaviors found in the set of potential behaviors, but not in the set of required behaviors; and
- determining a security rating based on the set of security related behaviors for the application in the plurality of application marketplaces.

* * * * *